(12) United States Patent
Czainski

(10) Patent No.: US 9,793,040 B2
(45) Date of Patent: Oct. 17, 2017

(54) ARRANGEMENT FOR PROVIDING VEHICLES WITH ENERGY COMPRISING MAGNETIZABLE MATERIAL

(71) Applicant: Bombardier Transportation GmbH, Berlin (DE)

(72) Inventor: Robert Czainski, Szczecin (PL)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 14/400,015

(22) PCT Filed: May 14, 2013

(86) PCT No.: PCT/EP2013/059952
§ 371 (c)(1),
(2) Date: Nov. 10, 2014

(87) PCT Pub. No.: WO2013/171220
PCT Pub. Date: Nov. 21, 2013

(65) Prior Publication Data
US 2015/0137933 A1    May 21, 2015

(30) Foreign Application Priority Data
May 14, 2012 (GB) .................................. 1208508.0

(51) Int. Cl.
*H01F 27/24* (2006.01)
*H02J 7/00* (2006.01)
(Continued)

(52) U.S. Cl.
CPC ................ *H01F 27/24* (2013.01); *B60L 9/00* (2013.01); *B60L 11/1831* (2013.01);
(Continued)

(58) Field of Classification Search
CPC .......... H01F 27/24; H01F 27/28; H01F 27/36; H01F 27/365; H01F 38/14; H01F 41/06;
(Continued)

(56) References Cited

U.S. PATENT DOCUMENTS

| 4,118,704 A | 10/1978 | Ishino et al. |
| 2008/0129246 A1 | 6/2008 | Morita et al. |

(Continued)

FOREIGN PATENT DOCUMENTS

| CN | 104205255 A | 12/2014 |
| WO | 2006129704 A1 | 12/2006 |

(Continued)

OTHER PUBLICATIONS

Tang et al. "Evaluation of the Shielding Effects on Printed-Circuit-Board Transformers Using Ferrite Plates and Copper Sheets"; IEEE Transactions on Power Electronics; 2002; pp. 1080-1088; vol. 17:6.

*Primary Examiner* — Mangtin Lian
(74) *Attorney, Agent, or Firm* — The Webb Law Firm

(57) ABSTRACT

The invention relates to an apparatus for providing vehicles with energy by magnetic induction. The apparatus has a primary side electric conductor and a field shaping layer. The invention also relates to a composite layer for shaping magnetic field lines of an electromagnetic field generated by an electric conductor. The composite layer includes a continuous supporting layer and a plurality of elements made of magnetizable material. Finally, the invention relates to a method of generating an apparatus for providing vehicles with energy by magnetic induction.

11 Claims, 2 Drawing Sheets

(51) Int. Cl.
*H01F 7/06* (2006.01)
*H01F 17/04* (2006.01)
*B60L 9/00* (2006.01)
*B60L 11/18* (2006.01)
*H01F 27/36* (2006.01)
*H01F 38/14* (2006.01)
*H01F 27/28* (2006.01)
*H01F 41/06* (2016.01)

(52) U.S. Cl.
CPC ............. *H01F 27/28* (2013.01); *H01F 27/36* (2013.01); *H01F 27/365* (2013.01); *H01F 38/14* (2013.01); *H01F 41/06* (2013.01); *B60L 2200/18* (2013.01); *B60L 2200/26* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y10T 29/4902* (2015.01); *Y10T 29/49071* (2015.01)

(58) Field of Classification Search
CPC .... B60L 9/00; B60L 11/1831; B60L 2200/18; B60L 2200/26; Y10T 29/49071; Y10T 29/4902; Y02T 90/125; Y02T 90/12; Y02T 90/121; Y02T 90/14; Y02T 10/7005
USPC ..... 336/84 R, 178, 221, 232, 212; 29/602.1; 307/104; 320/108, 109
See application file for complete search history.

(56) References Cited

U.S. PATENT DOCUMENTS

| | | | |
|---|---|---|---|
| 2008/0213615 A1* | 9/2008 | Kino | H01F 27/255 428/596 |
| 2010/0007215 A1* | 1/2010 | Sakuma | H01F 38/14 307/104 |
| 2010/0072815 A1* | 3/2010 | Hahn | B60L 5/005 307/17 |
| 2010/0320843 A1* | 12/2010 | Kitamura | H01F 27/34 307/104 |
| 2012/0161696 A1* | 6/2012 | Cook | B60L 11/182 320/108 |
| 2012/0218068 A1* | 8/2012 | Yamakawa | H01Q 7/04 336/90 |
| 2013/0249477 A1* | 9/2013 | Keeling | H01F 27/02 320/108 |
| 2013/0304443 A1 | 11/2013 | Suh et al. | |

FOREIGN PATENT DOCUMENTS

| | | |
|---|---|---|
| WO | 2010000495 A1 | 1/2010 |
| WO | 2010098547 A2 | 9/2010 |
| WO | 2010117139 A2 | 10/2010 |
| WO | 2011016737 A1 | 2/2011 |
| WO | 2011149263 A2 | 12/2011 |
| WO | 2012008672 A1 | 1/2012 |

\* cited by examiner

ARRANGEMENT FOR PROVIDING VEHICLES WITH ENERGY COMPRISING MAGNETIZABLE MATERIAL

CROSS-REFERENCE TO RELATED APPLICATIONS

This application is the United States national phase of International Application No. PCT/EP2013/059952 filed May 14, 2013, and claims priority to United Kingdom Patent Application No. 1208508.0 filed May 14, 2012, the disclosures of which are hereby incorporated in their entirety by reference.

BACKGROUND OF THE INVENTION

Field of the Invention

The invention relates to an arrangement for providing vehicles with energy by magnetic induction. The arrangement comprises a primary side electric conductor arrangement or assembly adapted to generate an electromagnetic field while an alternating electric current flows through the conductor arrangement and a field shaping layer comprising magnetizable material adapted to shape magnetic field lines of the electromagnetic field.

Furthermore, the invention relates to a corresponding method of manufacturing the arrangement and to means adapted to shape magnetic field lines of an electromagnetic field which is produced by the electric conductor arrangement.

Description of Related Art

During operation of a system for providing vehicles with energy by magnetic induction, the electromagnetic field which is generated by the primary side electric conductor arrangement is received by a receiving device on the secondary side (the side of the vehicle) and the electromagnetic field energy is converted back into electric energy by magnetic induction. The invention especially relates to the primary side of such a system. The receiving device can be named "pick-up" and is part of the vehicle, while the primary side electric conductor arrangement is typically buried in the ground or is otherwise mechanically connected to the track of the vehicle or to the place where the vehicle may stop or may be parked.

The terms "primary side" and "secondary side" are used corresponding to the terminology which is used for transformers. In fact, the electric parts of a system for transferring electric energy from a vehicle track or from a vehicle stop to the vehicle by induction form a kind of transformer. The only difference compared to a conventional transformer is the fact that the vehicle, and thus the secondary side, can move.

WO 2010/000495 A1 describes a system and method for transferring electric energy to a vehicle. The energy can be transferred to the vehicle while the vehicle is moving. While the present invention may relate to such a system, it is not restricted to the transfer of energy to moving vehicles. Rather, the energy may be transferred while the vehicle temporarily stops (such as a bus at a bus stop) or while the vehicle is parked.

The vehicle may be any land vehicle, including track bound vehicles, such as conventional rail vehicles, monorail vehicles, trolley busses and vehicles which are guided on a track by other means. Other examples of land vehicles are road automobiles, including busses which are not track bound. For example, the vehicle may be a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

WO 2010/000495 A1 describes an example of serpentine windings on the primary side for producing the electromagnetic field. The primary side conductor assembly of the present invention, which is made of electrically conducting material that produces the electromagnetic field during operation while the electrically conducting material carries an alternating electric current, may have the same or a different configuration. In any case, at least sections and/or parts of the primary side conductor assembly has/have a length and a width, so that the primary side conductor assembly comprises lateral edges. For example, as described in WO 2010/000495 A1, sections of the primary side conductor assembly may extend along the track of the vehicle so that there are two lateral edges on opposite sides of the primary side conductor assembly. Other configurations are possible such as elongated electric conductors extending in the direction of travel, coils of electric conductors having several windings and arrangements of electric conductors having different configurations.

The features of a primary side conductor assembly which are described in the foregoing description may also apply to a secondary side conductor assembly, with the exception that this assembly is located on board the vehicle.

In any case, the primary side conductor assembly causes emissions of the electromagnetic field, which is produced by the primary side conductor assembly, to the surroundings. Corresponding limit values, in particular of the electromagnetic or magnetic field strength, must be observed. In addition, the secondary side conductor assembly also causes emissions.

The primary side conductor assembly and the secondary side conductor assembly should be coupled to each other in an effective manner.

SUMMARY OF THE INVENTION

Therefore, it is an object of the present invention to provide an arrangement for providing vehicles with energy by magnetic induction, to provide a corresponding method of manufacturing such an arrangement and to provide suitable means so that the energy can be transferred from the primary side to the secondary side in an effective manner and so that the field strength in at least a part of the surroundings is reduced.

It is a basic idea of the present invention to use magnetizable material in order to shield a part of the surroundings, in particular the area below the primary side conductor arrangement, from the electromagnetic field(s) produced by the primary side conductor assembly. Therefore, a shielding assembly comprising magnetizable material is combined with the conductor assembly. Preferably, the shielding assembly may also comprise electrically conducting material which is, in particular, not magnetizable material. An example is aluminum. In particular, the electric conductivity of the electrically conducting material is higher than the electric conductivity of the magnetizable material by a factor of at least 1,000 (thousand), preferably by a factor of at least 10,000 (ten thousand). For example, in practice, the electric conductivity of ferrite may be in the range of $10^{-7}$ to 1 A/(Vm) and the electric conductivity of the electrically conducting material (for example a metal, such as aluminum) may be in the range of $10^6$ to $10^8$ A/(Vm).

In particular, the shielding assembly or a part of the shielding assembly may extend below the primary side conductor assembly, below the level of the conductor assembly. As a result, regions which are located beyond the magnetizable material (if viewed from the conductor assembly) are shielded from the electromagnetic field produced by the conductor assembly.

If there is also electrically conducting material, a system for transferring electric energy to a vehicle, in particular to a road automobile or to a track bound vehicle such as a light rail vehicle, may comprise the primary side electric conductor arrangement for producing a magnetic field and for thereby transferring the energy to the secondary side, wherein the current line or lines of the primary side electric conductor arrangement extend(s) at a first height level, an electrically conductive shield for shielding the magnetic field extends below the first height level, and the magnetizable material extends at a second height level above the shield. This arrangement can, in addition or alternatively, be used sideways of the primary side electric conductor arrangement, i.e. the electrically conductive material is placed beyond the magnetizable material, if viewed from the current line or lines of the conductor arrangement. This arrangement can be modified by replacing the layer of magnetizable material consisting of magnetizable material elements by a continuous layer made of magnetizable material.

In particular, magnetizable material can be used which has small electric conductibility, for example ferrites. As a result, the effects of electric currents which are induced in the shielding material are reduced. More generally speaking, the magnetizable material may be ferromagnetic, paramagnetic or ferrimagnetic. It is preferred that the magnetizable material has a magnetic susceptibility of at least 10, preferably at least 50.

Using magnetizable material as shielding material has the advantage that flux lines of the magnetic field are guided within the material. Therefore, the material can be characterized as magnetic field line (i.e. magnetic flux line) shaping material. Compared to the situation without the presence of the shielding material, at least some of the magnetic flux lines cannot permeate the magnetizable material. Instead, these magnetic flux lines are redirected in the direction of extension of the magnetizable material.

Furthermore, the magnetizable material has the effect that it can concentrate or bundle the magnetic flux lines of the field in the area between the primary side conductor assembly and the secondary side receiving device. However, the relative position of the receiving device and the primary side conductor arrangement can vary, since the vehicle may drive or may stop at different positions. Since the density of the magnetic flux lines (i.e. the field strength) also varies, especially if viewed in the direction of the lateral horizontal direction of a vehicle track, the degree of efficiency of the transfer of power from the primary side to the secondary side also varies with the relevant position of the receiving device and the primary side conductor assembly. However, it is desired that the impact of this dependency is reduced.

It is therefore proposed to use a field shaping layer comprising magnetizable material. In particular, the field shaping layer is positioned beyond the primary side conductor arrangement, if viewed from the receiving device (in particular if viewed from above). If the track or vehicle stop extends horizontally, the field shaping layer is integrated preferably in a construction under the primary side conductor arrangement. In particular, this construction may be the construction of a railway or of a road for automobiles. Alternatively, the construction may be the construction of a parking area for parking at least one vehicle.

In order to reduce the dependency of the power transfer efficiency on the relative position of the receiving device and the primary side conductor assembly, it is proposed that the field shaping layer comprises a plurality of elements made of the magnetizable material, wherein neighbouring elements are positioned at a distance to each other.

In particular, the following is proposed:

An arrangement for providing vehicles with energy by magnetic induction, wherein the arrangement comprises:
  a primary side electric conductor arrangement adapted to generate an electromagnetic field while an alternating electric current flows through the conductor arrangement and
  a field shaping layer comprising magnetizable material adapted to shape magnetic field lines of the electromagnetic field,
wherein the field shaping layer comprises a plurality of elements made of the magnetizable material, wherein neighbouring elements are positioned at a distance to each other.

Furthermore, a method is proposed of generating an arrangement for providing vehicles with energy by magnetic induction, wherein:
  a primary side electric conductor arrangement, adapted to generate an electromagnetic field while an alternating electric current flows through the conductor arrangement, is provided and
  a field shaping layer, comprising magnetizable material adapted to shape magnetic field lines of the electromagnetic field, is arranged in the ambience of the conductor arrangement,
wherein the field shaping layer is arranged using a plurality of elements made of the magnetizable material, wherein neighbouring elements are positioned at a distance to each other.

In particular, the elements may be in the shape of tiles. The tiles may therefore comprise parallel (in particular planar) upper and lower surfaces. Therefore, a vertical cross section through the tile may comprise a rectangular shaped outline of the tile, wherein the upper and lower surfaces form the parallel upper and lower straight linear sections of the outline. Preferably, all elements or at least the majority of the elements of the field shaping layer may have the same shape. In addition, it is preferred that the elements of the field shaping layer are positioned in the same plane. If the layer extends in a horizontal plane, the upper surfaces of tile-shaped elements of the layer are positioned in a common horizontal plane and the same applies to the lower surfaces. However, it is an advantage of the field shaping layer comprising a plurality of elements positioned at a distance to each other that there is some flexibility with respect to the positioning of the elements. For example, if the surface of the base, on which the field shaping layer is to be positioned, is not exactly smooth or planar, the extension of the field shaping layer will also be non-planar. It is a further advantage of the proposed configuration of the field shaping layer that deviations of the elements from an ideal position within a plane modify the magnetic flux density beyond the primary side conductor arrangement only slightly.

A further advantage of the field shaping layer according to the present invention is the fact that the resulting inductance of the system, which includes the primary side conductor assembly and the secondary side receiving device, is not sensitive to the relative position of the receiving device and the primary side conductor assembly. This applies to vertical and lateral displacement of the receiving device. Therefore, if the receiving device is adapted to be operated in resonance, changes to the relative position will not significantly reduce the efficiency of power transfer. The total arrangement which is adapted to transfer energy from the primary side to the secondary side may comprise a control for controlling the electric properties of the primary side and/or secondary side so that the receiving device is operated in resonance. However, at least in some applications, such a control is no longer necessary, since the arrangement is not sensitive to changes in the relative position.

In particular, the distance between two neighboring elements is smaller than the extension of the neighboring elements in the direction across the distance. Preferably, the distance is smaller by at least a factor of five and preferably by a factor of ten (i.e. the distance multiplied by the factor is equal to the extension).

In particular, the outline of the individual elements of the layer in the direction perpendicular to the layer may have any shape. It is preferred that the outline is shaped in such a manner that the distances to each of the neighboring elements can have the same size. A preferred outline shape is rectangular or quadratic. However, it would also be possible to use elements having a regular hexagonal outline (e.g. an arrangement of the elements like a honeycomb structure), a circular outline, an oval outline or a triangular outline, for example.

In view of the manufacture of the arrangement, i.e. in view of the process of placing the elements of the layer on site, it is preferred that gaps between pairs of neighboring elements are aligned with gaps of other pairs of neighboring elements so that there is at least one continuous straight gap extending in a longitudinal direction and/or that there is at least one continuous straight gap between different pairs extending in a lateral direction, perpendicular to the longitudinal direction of the layer. Therefore, it is preferred that the outline of the elements is rectangular or quadratic and that the elements of the layer all have the same size, so that the elements can be arranged in columns and rows, if viewed in a direction perpendicular to the layer. The straight gaps also follow the lines of the columns and rows, in this case.

If there is at least one straight continuous gap extending from one side of the layer to the opposite side, and if the elements are fixed on a flexible support material, the layer can be pre-fabricated by fixing the elements on the flexible support material and folding the layer along the straight continuous gap. If there are several straight continuous gaps, the pre-fabricated arrangement can be folded multiply. For example, if there is a multiplicity of straight continuous gaps which extend parallel to each other, the pre-fabricated arrangement can be folded along these parallel straight gaps and the required space during transport of the pre-fabricated arrangement to the location on site, where the arrangement is to be operated, is significantly reduced. For example, the pre-fabricated arrangement can be folded in the manner of a coil or in the form of serpentines.

In the following, a composite layer is described as a means for shaping magnetic field lines of an electromagnetic field generated by an electric conductor arrangement. The continuous supporting layer of this composite layer may be the flexible material mentioned above. The composite layer comprises a plurality of the elements made of magnetizable material (preferably a ferrite), wherein the elements are positioned at a distance to each other and are fixed on the supporting layer. Again, the elements can be in the shape of tiles, for example the tiles mentioned above.

Preferably, the elements are evenly distributed over the extension of the field shaping layer in a longitudinal direction of the layer and/or in a lateral direction of the layer.

According to a preferred embodiment, the continuous supporting layer (e.g. a sheet of metal) is made of an electrically conducting material. For example, the electrically conducting material may be aluminum, which may be annealed aluminum, so that it is flexible and can be folded at least at one straight gap.

Preferably, the continuous supporting layer made of the electrically conducting material is positioned further away from the primary side conductor arrangement than the elements made of magnetizable material.

The additional layer of electrically conducting material (the same applies to an alternative embodiment where the layer of electrically conducting material is not a layer to which the magnetizable elements are fixed) has the advantage that it provides an additional shielding effect. The area beyond the electrically conducting material is effectively shielded from electromagnetic fields, in particular fields produced by the primary side conductor arrangement.

In particular, if the elements are in the shape of tiles and if there is a distance or gap in between each pair of neighboring elements, the arrangement can be called a mosaic. The tiles are preferably evenly (i.e. in a homogeneous manner) distributed over the extension of the layer.

For example, the individual elements can be manufactured by casting. Preferably, the magnetizable material is a ferrite material in this case.

In particular, the elements of magnetizable material can be fixed to the supporting layer, in particular to the supporting layer made of electrically conducting material, using an additional connecting material, which is preferably also flexible (like the preferred embodiment of the supporting material). The connecting material may be an adhesive, such as a polymer or any other plastic material. Consequently, the elements of magnetizable material are positioned at a distance to the supporting material. In case of a metal material as supporting material, the shielding effect is improved and corrosion can be excluded. The distance between the elements (for example ferrite elements) and the metal supporting layer (for example made of aluminum) is preferably in the range of some millimeters.

In particular, a composite layer comprising the continuous supporting layer and the elements, the composite layer being wound in the form of a coil or being folded in sections on top of each other, can be provided to and placed at a part of an target area on site and can be unwound or unfolded so that it occupies the target area.

Especially in the case of the composite layer, but also in other embodiments of the arrangement, the magnetizable material is preferably combined with electrically conducting material (as mentioned above). If viewed from the primary side electric conductor arrangement, there is a layer comprising the elements of the magnetizable material (in short: the magnetic layer), wherein the neighbouring elements are positioned at a distance to each other, thereby leaving gaps in between the elements. Furthermore, still viewed from the primary side electric conductor arrangement, the electrically conducting material is located beyond the magnetic layer, wherein the electrically conducting material is at least positioned behind the gaps in between the elements and preferably forms a continuous layer behind the magnetic layer. In any case, electrically conducting material may also be located behind areas (i.e. behind a margin) outside of the outline of the arrangement of the elements, for example if the continuous layer extends beyond the outline of the arrangement of the elements. Thereby, the electrically conducting material covers at least the gaps, wherein the electrically conducting material optionally comprises through holes so that only a part of the area of the gaps or margin is covered.

Consequently, hypothetical rays extending from the primary side electric conductor arrangement towards the magnetic layer in straight directions perpendicular to the magnetic layer either impinge on one of the elements of magnetizable material or pass a gap (or more generally speaking: impinge on a region free of magnetizable material). The rays impinging on a region free of magnetizable material pass the region and impinge on the electrically conducting material or—optionally—pass a through hole of the electrically conducting material. Of course, in practice, these hypothetical rays would penetrate any other material of the arrangement in between the primary side electric conductor arrangement and the magnetic layer and optionally would also penetrate any material (which is neither magnetisable material nor electrically conducting material) in the gaps and/or between the magnetic layer and the electrically conducting material. As a result, the area within the magnetic layer which is occupied by the elements of magnetizable material (which is the sum of the areas defined by the outlines of the individual elements) can be calculated as the total magnetic area viewed by the primary side electric conductor arrangement. Furthermore, the area behind the magnetic layer which is occupied by the electrically conducting material can be calculated as the total electrically conducting area viewed by the primary side electric conductor arrangement. If there are no through holes in the electrically conducting material, the area of the gaps within the magnetic layer (plus the area of any margin, see above) is equal to the total electrically conducting area.

According to the preferred embodiment, the ratio of the total magnetic area to the total area of the magnetic layer (i.e. the sum of the total magnetic area and the area of the regions free of magnetizable material) is at least 70%, preferably at least 81% and most preferred at least 84%. Still according to the preferred embodiment, the ratio of the total magnetic area to the total area of the magnetic layer is not greater than 97%, preferably not greater than 94% and most preferred not greater than 89%.

This ratio of the total magnetic area to the total area of the magnetic layer has the advantage that the (above-mentioned) sensitivity of the resulting inductance of the system for transferring energy from the primary side conductor assembly to the secondary side receiving device with respect to the relative position of the receiving device and the primary side conductor assembly is particularly small. In particular, the ratio depends on the distance of the primary side conductor assembly to the magnetic layer. Preferably, this distance is not greater than 20 cm. In this case, the ratio can be chosen so that it is at least 81% and preferably at least 84% and can be chosen so that it is not greater than 94% and preferably not greater than 89%. In particular, if these values limits are met, the inductance of a coil of an electric conductor (see below) does not vary by more than plus or minus 5% if the coil's distance to the magnetic layer is varied from 30 cm by plus or minus 10 cm.

More generally speaking, the ratio of the area within the field shaping layer (mentioned above) occupied by the elements made of magnetizable material on one hand to the total area of the field shaping layer, including regions within the field shaping layer free of magnetizable material, on the other hand is preferably within these limits. With respect to the composite layer mentioned above, the plurality of elements made of magnetizable material are preferably arranged so as to form a magnetic layer, wherein the ratio of the area within the magnetic layer occupied by the elements made of magnetizable material on one hand to the total area of the magnetic layer, including regions within the magnetic layer free of magnetizable material, on the other hand is preferably within these limits.

The combination of the magnetizable material leaving gaps in between the elements which are covered on the back side by electrically conducting material has a compensating effect on the inductance of a coil of an electric conductor: the closer the coil is located to electrically conducting material, the smaller the inductance, and the closer the coil is located to magnetizable material, the greater the inductance. The compensating effect of the combination of the materials is the reason for the reduced sensitivity with respect to the relative position of the receiving device and the primary side conductor assembly.

In particular, the invention can be applied to the construction of a route (such as a railway or a road) for vehicles.

BRIEF DESCRIPTION OF THE DRAWINGS

Examples and preferred embodiments of the invention will be described with reference to the attached figures which show FIG. 1 a schematic top view of a composite layer comprising a plurality of elements made of magnetizable material which are arranged in rows and columns on a supporting layer, FIG. 2 a schematic top view similar to the arrangement shown in FIG. 1, wherein the elements are rectangular elements extending from one side of the arrangement to the opposite side, FIG. 3 an enlarged view of the area of the arrangement shown in FIG. 1 which is marked by dashed line III, FIG. 4 a schematic representation of a cross-section of an arrangement including the surface of a track or road on which a vehicle may travel or may stop, an embedded primary side conductor arrangement and a composite layer similar to the layer shown in FIG. 1, and FIG. 5 the composite layer of FIG. 4, wherein the layer is folded slightly along three straight gaps between elements.

DESCRIPTION OF THE INVENTION

Figure 1:
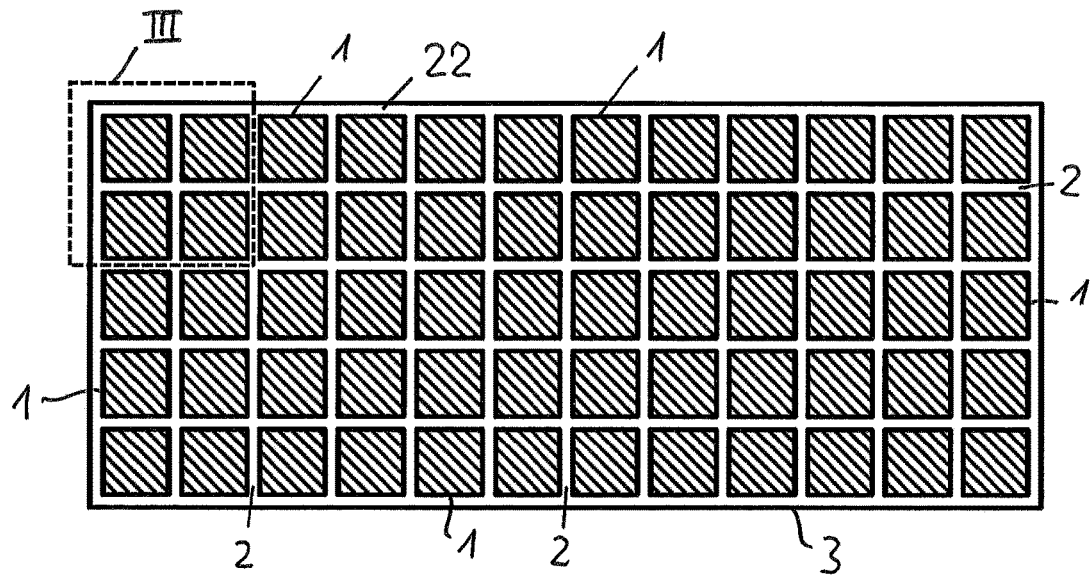

The arrangement shown in FIG. 1 comprises in total sixty elements made of magnetizable material, some of the elements are denoted by 1. The elements 1 are arranged in columns of in each case five elements 1 and rows of in each case twelve elements 1. The number of elements per column and row is just an example, may vary and depends in practice on the desired configuration, in particular on the desired dimensions of the layer.

There is a distance between each pair of neighboring elements 1 (see also FIG. 3) so that corresponding gaps 2 exist between the neighboring elements 1, which gaps are free of magnetizable material. In practice, these gaps may be free of material at all or may at least partly contain other (non-magnetizable) material.

There is a supporting layer 3 under the elements 1. As also shown in FIG. 3, the outline of the supporting layer 3 extends at a distance 22 to the edges of the elements 1a, 1b, 1c which are positioned next to the outline of the supporting layer 3.

Figure 3:
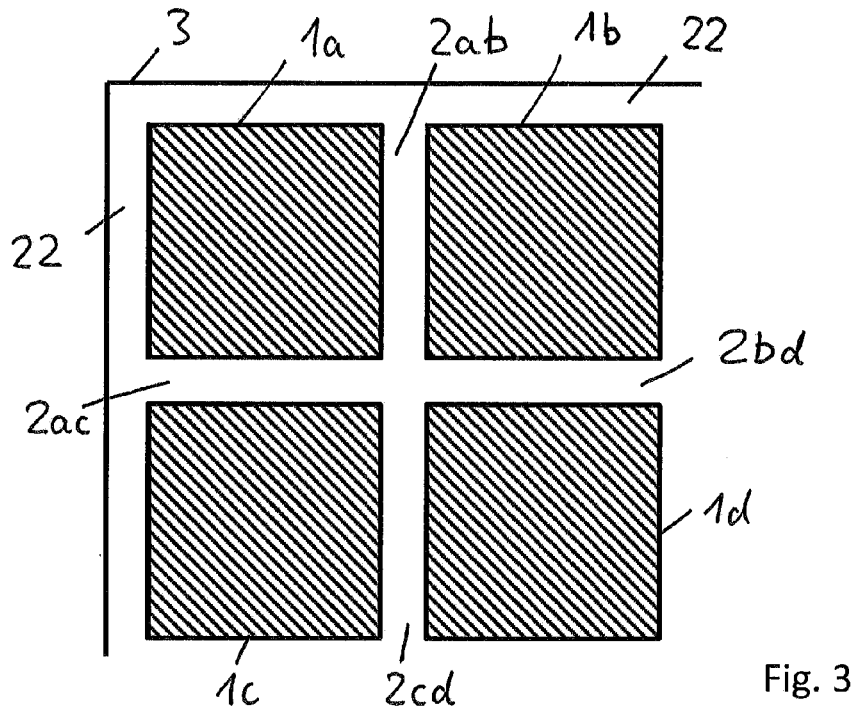

The gaps in between two neighboring elements 1, for example between element 1a and element 1c, are denoted by reference numeral 2 and the letter which is used to denote the neighboring elements (for example, the gap in between the neighboring elements 1a, 1c is denoted by 2a, 2c in FIG. 3). The gaps are aligned to form straight continuous gaps. In particular, the gaps between all pairs of neighboring elements 1 have the same widths (i.e. the distance between the neighboring elements is the same).

For example, in case of the embodiment shown in FIG. 1, the lengths (in horizontal direction of FIG. 1) and widths (in vertical direction of FIG. 1) of the elements 1 may be equal and may amount to 10 cm. In this case, the distance between any two neighboring elements 1 across the corresponding gap 2 may be in the range of 0.75 to 1.25 cm, preferably in the range of 0.9 to 1.1 cm and may amount to 1 cm, for example.

Figure 2:
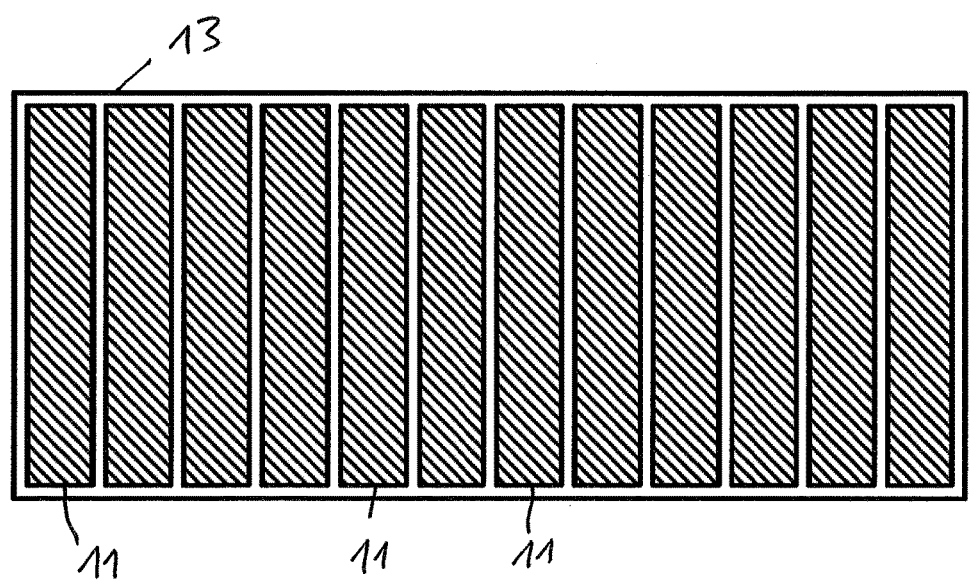

As will be described in connection with FIG. 5, the supporting layer can be folded along the continuous straight gaps. This is also possible with the modified arrangements shown in FIG. 2, although this kind of composite layer is not preferred. The elements 11 of the arrangement shown in FIG. 2 are wider in lateral direction (the vertical direction in FIG. 2) compared to the arrangement shown in FIG. 1. The individual elements 11 extend from one side in lateral direction to the opposite side in lateral direction. The supporting layer under the elements 11 is denoted by 13.

For example, in case of the embodiment shown in FIG. 2, the lengths (in horizontal direction of FIG. 1) of the elements 11 may be equal and may amount to 10 cm. In this case, the distance between any two neighboring elements 11 across the corresponding gaps may be in the range of 0.85 to 1.35 cm, preferably in the range of 1.0 to 1.2 cm and may amount to 1.1 cm, for example.

Other than shown in FIGS. 1 and 2, the distance there may be no distance between the outline of the supporting layer 3; 13 to the edges of the elements 1; 11, if viewed from above.

Figure 4:
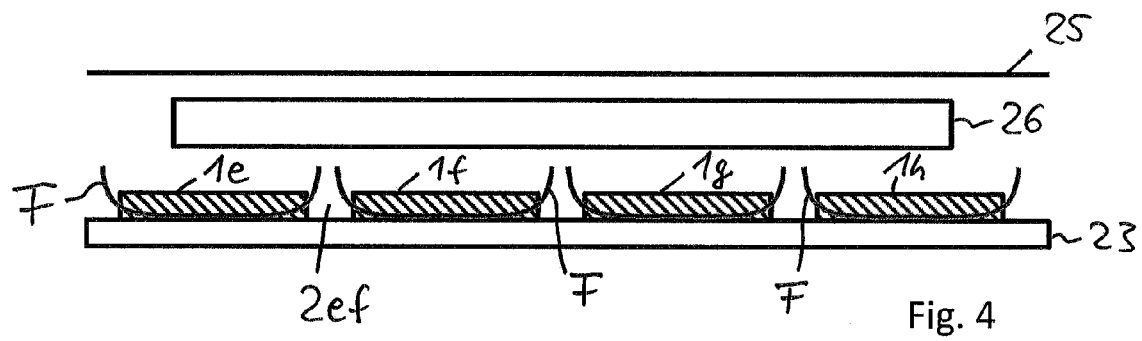

The cross-section shown in FIG. 4 can be interpreted in a different manner. In one case, the horizontal direction of FIG. 4 extends in longitudinal direction, so that the direction perpendicular to the image plane of FIG. 4 is the lateral direction. In this case, the number of elements 1e, 1f, 1g, 1h is preferably not the total number of consecutive elements made of magnetizable material which are arranged in longitudinal direction one behind the other.

According to another interpretation of FIG. 4, the horizontal direction of the figure is the lateral direction so that the longitudinal direction of the field shaping layer extends perpendicular to the image plane of FIG. 4. In this case, the number of four elements 1e, 1f, 1g, 1h which are positioned next to each other in a consecutive manner may be the total number of elements (but there may be more consecutive elements in lateral direction or fewer elements, in practice). In any case, the elements 1 are supported by a supporting layer 23. In particular, the elements 1 may be fixed on the upper surface of the supporting layer 23, for example using an adhesive. The adhesive is not shown and due to the presence of the adhesive, the elements 1 may be positioned at a distance (e.g. of some mm) in vertical direction, i.e. above the upper surface of the supporting layer.

At a distance above the upper surfaces of the elements 1, a primary side conductor arrangement 26 is located which produces—during operation—the electromagnetic field which is to be received by a receiving device of a vehicle (not shown). In the example of FIG. 4, the primary side conductor arrangement 26 is buried in the ground or integrated in the track of the vehicle and the surface of the track is denoted by 25.

The course of some magnetic flux lines F is shown in FIG. 4. However, only sections of the flux lines F in the area of the elements 1 are shown. The flux lines F are curved along their extension from above the elements 1, since the magnetizable material of the elements 1 redirect the flux lines F so as to follow the extension of the magnetizable material. The flux lines F shown are just examples. Other flux lines may enter the material of the elements 1 at other locations, for example at the upper surface of an element 1.

The horizontal extension of the field shaping layer according to the illustrations of FIG. 1-FIG. 4 is preferred, but not the only way of using a field shaping layer in connection with a primary side conductor arrangement. For example, the field shaping layer or an additional field shaping layer may be inclined with respect to the horizontal plane and/or may be positioned in lateral direction of the primary side conductor arrangement. It is also possible, that the same composite layer comprising a supporting layer and elements fixed to the supporting layer extends under and sideways (in lateral direction) of a primary side conductor arrangement.

Figure 5:
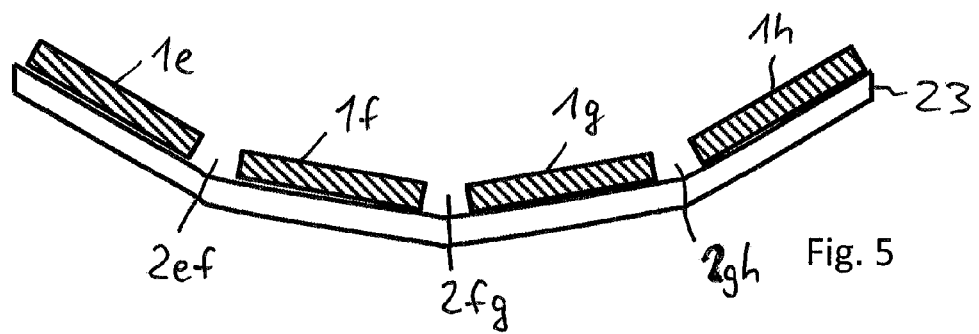

FIG. 5 shows that for example the composite layer 23, 1e-1h of FIG. 4 can be folded along the gaps between the neighboring elements 1. In the state shown in FIG. 5, the composite layer is folded along each of the three gaps 2ef, 2fg, 2gh. The folding angle shown in FIG. 5 is 20 degrees, but depending on the flexibility of the supporting layer 23 and depending on the width of the respective gap in between neighboring elements 1, the folding angle can be larger. For example, the arrangement shown in FIG. 5 can be folded to form a coil or to form layer sections which are stacked upon each other.

The invention claimed is:

1. An apparatus for providing vehicles with energy by magnetic induction, wherein the apparatus comprises:
    a primary side electric conductor configured to generate an electromagnetic field while an alternating electric current flows through the conductor; and
    a field shaping layer comprising magnetizable material configured to shape magnetic field lines of the electromagnetic field, wherein:
        the field shaping layer comprises a plurality of elements made of the magnetizable material fixed to a continuous supporting layer made of electrically conducting material that is non-magnetic;
        the plurality of the elements made of the magnetizable material is arranged in rows and columns with a gap in between each pair of neighbouring elements in the rows and in the columns;
        the neighbouring elements are positioned at a distance to each other;
        the primary side electric conductor is positioned at a distance to the plurality of elements; and
        the field shaping layer is folded or coiled with respect to one of two possible directions of the rows and columns of the magnetizable material.

2. The apparatus of claim 1, wherein the distance between two neighbouring elements is smaller than an extension of the neighbouring elements in a direction across the distance.

3. The apparatus of claim 1, wherein a ratio of an area within the field shaping layer occupied by the elements to a total area of the field shaping layer, including regions within the field shaping layer free of the elements, is at least 70% and is not greater than 97%.

4. The apparatus of claim 1, wherein the elements are in the shape of tiles.

5. The apparatus of claim 1, wherein the elements are evenly distributed over an extension of the field shaping layer in a longitudinal direction of the layer or in a lateral direction of the layer.

6. A method of generating energy by magnetic induction, comprising:
   providing a primary side electric conductor adapted to generate an electromagnetic field while an alternating electric current flows through the conductor; and
   providing a field shaping layer, comprising magnetizable material adapted to shape magnetic field lines of the electromagnetic field, arranged in an ambience of the conductor, wherein:
      the field shaping layer comprises a plurality of elements made of the magnetizable material fixed to a continuous supporting layer made of electrically conducting material that is non-magnetic;
      the plurality of the elements made of the magnetizable material is arranged in rows and columns with a gap in between each pair of neighbouring elements in the rows and in the columns;
      the neighbouring elements are positioned at a distance to each other;
      the primary side electric conductor is positioned at a distance to the plurality of elements; and
      folding or coiling the field shaping layer with respect to one of two possible directions of the rows and columns of the magnetizable material.

7. The method of claim 6, wherein a ratio of an area within the field shaping layer occupied by the elements to a total area of the field shaping layer, including regions within the field shaping layer free of the elements, is at least 70% and is not greater than 97%.

8. The method of claim 6, wherein the field shaping layer is constituted as a composite layer.

9. The method of claim 6, wherein neighbouring elements are positioned at a distance to each other which is smaller than an extension of the neighbouring elements in a direction across the distance.

10. The method of claim 6, wherein the elements are evenly distributed over an extension of the field shaping layer in a longitudinal direction of the layer or in a lateral direction of the layer.

11. The method of claim 8, further comprising:
   providing the composite layer wound in the form of a coil or folded in sections on top of each other to a part of a target area on site; and
   unwinding or unfolding the composite layer so that it occupies the target area.

* * * * *